(12) United States Patent
Settelmayer

(10) Patent No.: US 7,357,283 B2
(45) Date of Patent: Apr. 15, 2008

(54) UNIVERSAL CROSSBAR CLAMP

(75) Inventor: Joseph J. Settelmayer, Fieldbrook, CA (US)

(73) Assignee: Yakima Products, Inc., Beaverton, OR (US)

( * ) Notice: Subject to any disclaimer, the term of this patent is extended or adjusted under 35 U.S.C. 154(b) by 0 days.

(21) Appl. No.: 11/198,901

(22) Filed: Aug. 5, 2005

(65) Prior Publication Data

US 2006/0086766 A1    Apr. 27, 2006

Related U.S. Application Data

(60) Provisional application No. 60/601,511, filed on Aug. 12, 2004.

(51) Int. Cl.
*B60R 9/00* (2006.01)

(52) U.S. Cl. ............... 224/322; 224/319; 224/321; 224/324

(58) Field of Classification Search .......... 224/323, 224/322, 324, 570, 456, 461, 536, 321, 331
See application file for complete search history.

(56) References Cited

U.S. PATENT DOCUMENTS

| | | | |
|---|---|---|---|
| 3,001,679 A * | 9/1961 | Canning et al. ............ 224/324 |
| 3,524,572 A * | 8/1970 | Hall ........................... 224/323 |
| 5,094,373 A | 3/1992 | Lovci | |
| 5,201,911 A * | 4/1993 | Lee ............................ 224/321 |
| 5,685,686 A | 11/1997 | Burns | |
| 5,820,002 A | 10/1998 | Allen | |
| 5,951,231 A | 9/1999 | Allen | |
| D422,553 S | 4/2000 | VonDuyke | |
| 6,164,507 A | 12/2000 | Dean et al. | |
| 6,283,310 B1 | 9/2001 | Dean et al. | |
| 6,286,738 B1 | 9/2001 | Robins et al. | |
| 6,367,673 B1 | 4/2002 | Smith et al. | |
| 6,422,441 B1 * | 7/2002 | Settelmayer et al. ........ 224/324 |
| 6,425,509 B1 | 7/2002 | Dean et al. | |
| 6,439,397 B1 * | 8/2002 | Reeves ........................ 224/324 |
| 6,681,971 B2 * | 1/2004 | Laverack et al. ............ 224/321 |
| 6,766,929 B2 * | 7/2004 | Karlsson .................... 224/331 |

FOREIGN PATENT DOCUMENTS

JP            200311733    *  1/2003

* cited by examiner

*Primary Examiner*—Nathan J. Newhouse
*Assistant Examiner*—Margaret Olson
(74) *Attorney, Agent, or Firm*—Kolisch Hartwell, P.C.

(57) ABSTRACT

System providing a securing arrangement for securing a load to a vehicle-mounted rack. The system includes clamp members adapted to secure the load-carrying member to a crossbar of the vehicle-mounted rack. The system includes an opposable clamp member and may include dimensionally different first and second opposing clamp members. The opposable clamp member may be configured to alternatively attach to the first and second opposing clamp members. The system may include an adjustable mounting mechanism configured to adjust an angle of the load-carrying member relative to the opposable clamp member. The opposable clamp member may include a plurality of alternative coupling sections configured to attach to the first and second opposing clamp members.

17 Claims, 3 Drawing Sheets

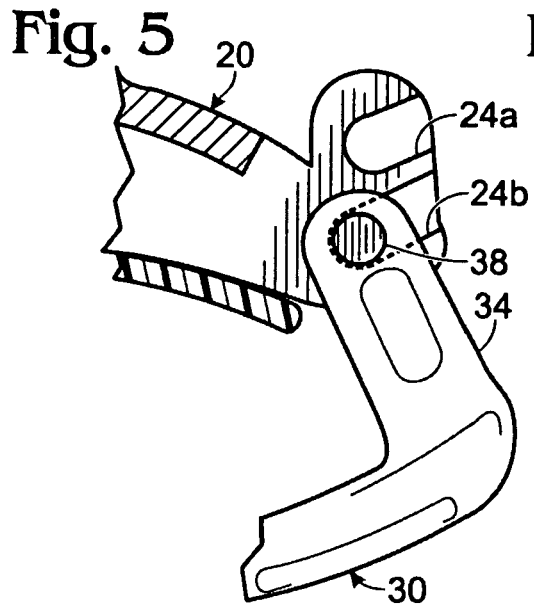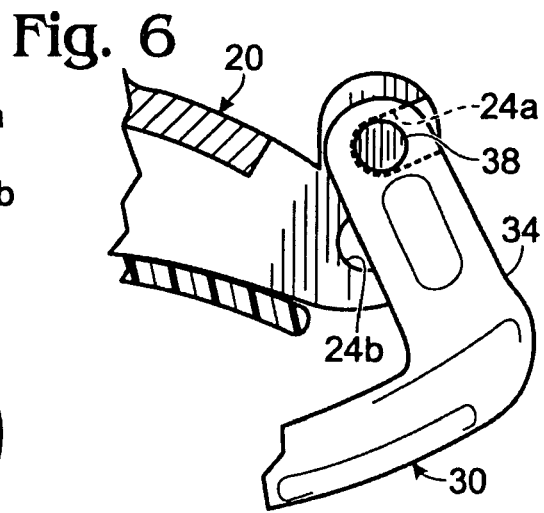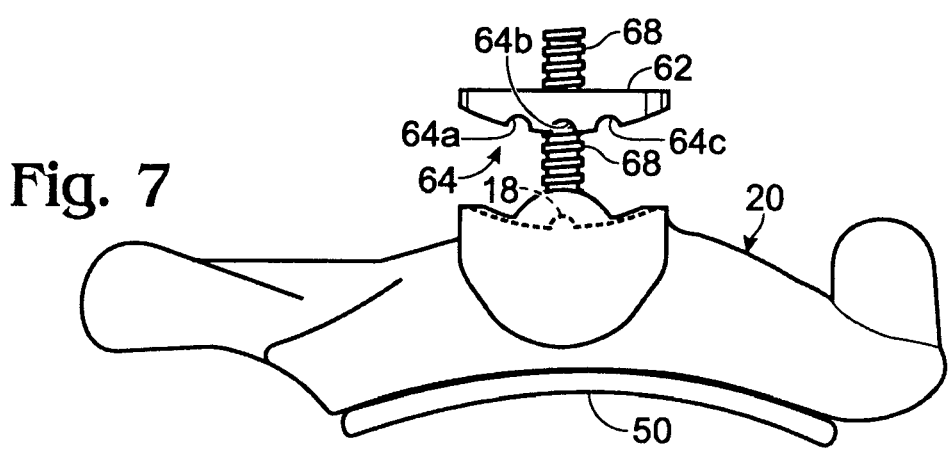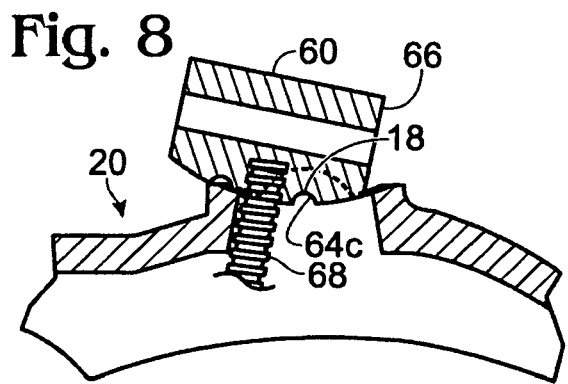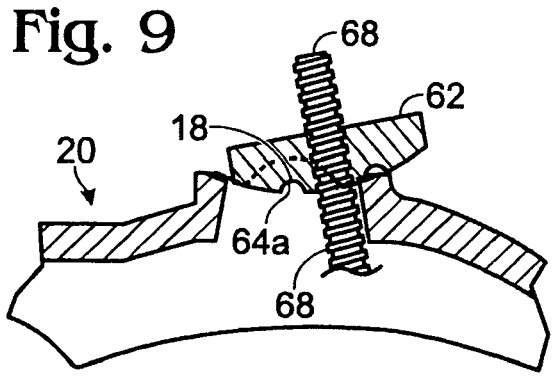

UNIVERSAL CROSSBAR CLAMP

CROSS-REFERENCE TO RELATED APPLICATIONS

This application claims priority under 35 U.S.C. § 119(e) to U.S. Provisional Patent Application Ser. No. 60/601,511 entitled "Securing Arrangement for Vehicle Load Carrier," filed Aug. 12, 2004, the complete disclosure of which is hereby incorporated by reference for all purposes.

TECHNICAL FIELD

The present disclosure relates generally to vehicle-mounted racks, and more particularly to securing a load to different styles of vehicle-mounted racks.

BACKGROUND

Vehicles are often fitted with racks for carrying cargo boxes, recreational equipment mounts, and various other types of loads carriers. These vehicle racks may include crossbars, rails, or other elongate structural members extending over the roof of the vehicle or adjacent the rear of the vehicle. For example, typical roof rack systems include longitudinal rails running parallel to the length of the vehicle, with one or more crossbar members extending between the longitudinal rails. Load carriers are often attached to the rails or crossbars of a vehicle rack by using a connecting device.

Rails and crossbars for vehicle rack systems are provided in an increasing range of shapes and sizes in order to accommodate a widening array of aesthetic and functional requirements. A connector device designed to fit a certain bar or range of bar shapes might not be compatible with other bars having other shapes and sizes. Accordingly, a load carrier manufacturer might provide various connecting devices for use with different shapes and sizes of rails or crossbars. This means that the manufacturer incurs additional costs associated with manufacturing various connector devices, and retailers incur the additional costs associated with stocking the various connector devices. Logistics of selecting appropriate mounting hardware at the point of sale may also be a complicated process. Furthermore, a consumer may need to purchase a different type of connector device for each vehicle or rack on which the consumer desires to mount a load carrier.

SUMMARY

The present disclosure is directed to a system and apparatus for securing a load to a vehicle-mounted, rack. The system includes clamp members adapted to secure the load-carrying member to a crossbar of the vehicle-mounted rack. The system includes an opposable clamp member and may include dimensionally different first and second opposing clamp members. The opposable clamp member may be configured to alternatively attach to the first and second opposing clamp members. The system may include an adjustable mounting mechanism configured to adjust an angle of the load-carrying member relative to the opposable clamp member. The opposable clamp member may include a plurality of alternative coupling sections configured to attach to the first and second opposing clamp members.

BRIEF DESCRIPTION OF THE DRAWINGS

FIG. 5 is a side view and partially cross-sectional view of a portion of a securing arrangement with a plurality of coupling sections.

FIG. 6 is a side view and partially cross-sectional view of a portion of an exemplary securing arrangement with a plurality of coupling sections.

FIG. 7 is a side view of an opposable clamp member and a mounting adjustment mechanism.

FIG. 8 is a side view and partially cross-sectional view of a portion of a clamp member attached to a mounting adjustment mechanism, with the mounting adjustment mechanism rotated to the right.

FIG. 9 is a side view and partially cross-sectional view of a portion of a clamp member attached to a mounting adjustment mechanism, with the mounting adjustment mechanism rotated to the left.

DETAILED DESCRIPTION

The present disclosure describes a system and apparatus for securing a load to a vehicle-mounted rack. Vehicle racks may be mounted on any type of vehicle (e.g., car, van, truck, etc.), and many vehicle manufacturers include factory-installed racks on some vehicle models. While racks are often mounted on the roofs of vehicles, racks may also be mounted on other parts of a vehicle, such as the trunk or rear of the vehicle. Vehicle racks include bars, such as crossbars and rails, for securing and supporting loads.

Figure 1:
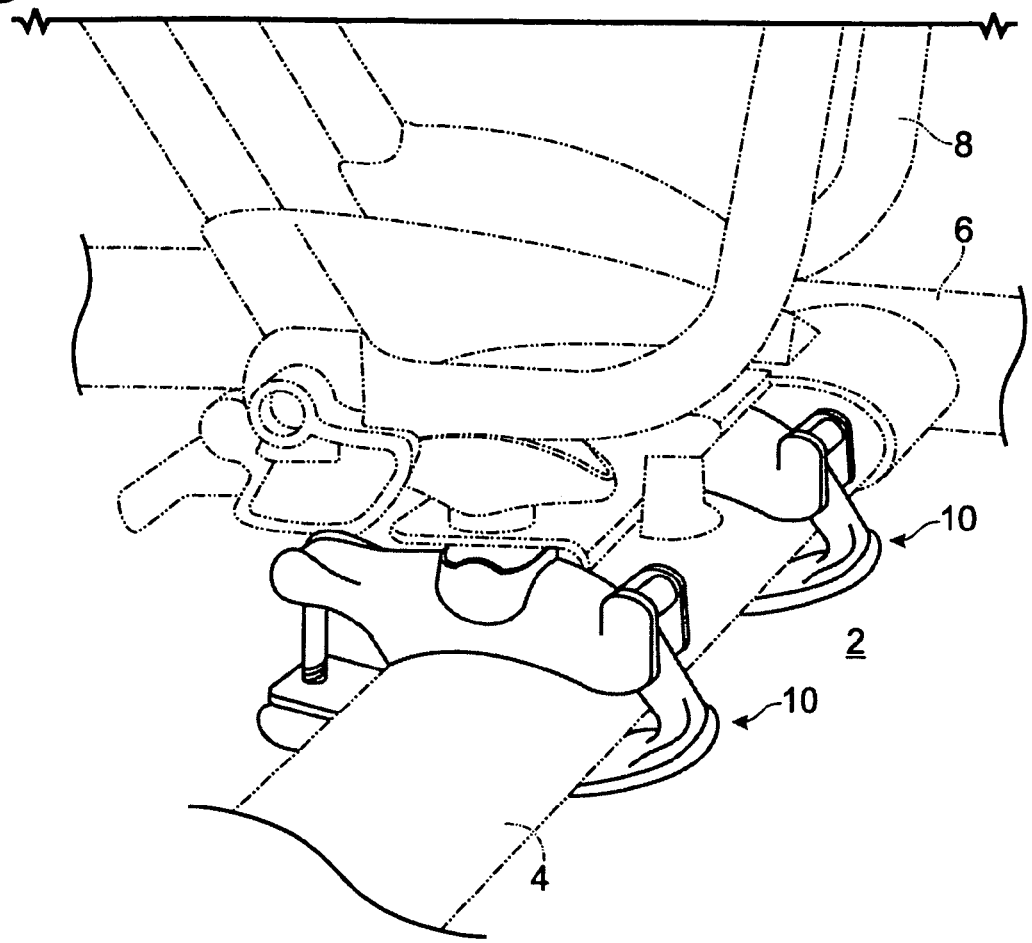
FIG. 1 is a perspective view of an apparatus for securing a load to a vehicle-mounted rack.

As shown in FIG. 1, a vehicle mounted rack may include a rail 6 attached to a vehicle roof 2. A crossbar 4 extends from rail 6. Crossbar 4 supports a load-carrying member 8, which is adapted to at least partially support a load. Examples of load-carrying members are described in U.S. Pat. Nos. 5,820,002; 5,685,686; 5,951,231; 5,094,373; 6,286,738; 6,164,507; D422553; 6,283,310; 6,425,509; 6,283,310; 6,367,673; and 6,422,441, all the disclosures of which are herein incorporated by reference.

While load-carrying member 8 is adapted to support a boat, it will be appreciated that load-carrying members may be adapted and used for any type of load, including recreational equipment for skiing, camping, boating, hiking, sailing, flying and traveling. For example, load carrying members may be provided for carrying skies, snowboards, surfboards, kayaks, bicycles, etc. Load carrying members may also be adapted to support non-recreational loads such as cargo baskets, cargo boxes, luggage, tool boxes, ladders, tools, etc.

Load-carrying member 8 is secured to crossbar 4 by securing arrangements 10. While crossbar 4 is shown to have an elliptical shape, crossbars may be square, round, rectangular, or any other shape, and may come in various sizes. A crossbar having a different size and/or shape than another crossbar is referred to herein as being dimensionally different than the other crossbar. The present disclosure describes securing arrangements configured to secure a load-carrying member to various dimensionally different crossbars.

Figure 2:
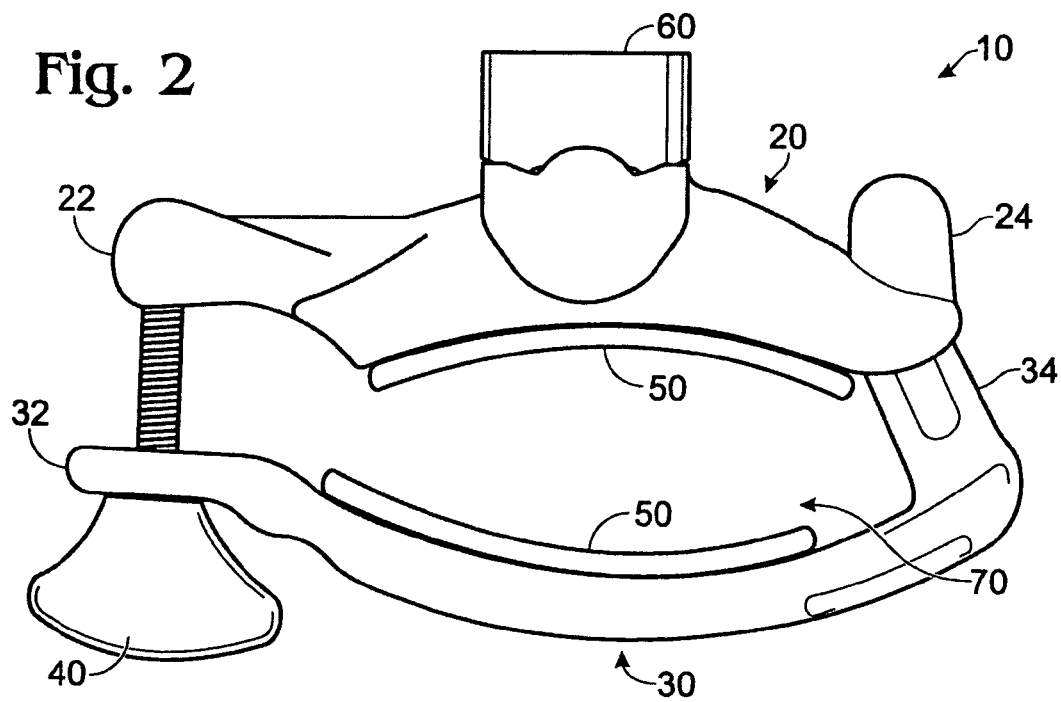
FIG. 2 is a side view of a securing arrangement for a vehicle load carrier.

FIG. 2 shows a side elevation of an exemplary securing arrangement 10 for a vehicle load carrier. Securing arrangement 10 includes a clamp member 20, a clamp member 30, a fastener 40, pads 50, and a mounting adjustment mechanism 60. Clamp members 20 and 30 are attached to form an opening 70 between pads 50. Clamp member 20, which is also referred to herein as an opposable clamp member, includes a coupling portion 24. Clamp member 30, which is also referred to herein as an opposing clamp member, includes a coupling portion 34 for attaching clamp member 30 to clamp member 20.

A distal portion 32 of clamp member 30 and a distal portion 22 of clamp member 20 are adjustably attached by fastener 40. Fastener 40 can be partially or completely removed from clamp member 30 and clamp member 40, thereby allowing a crossbar to pass between distal portions 22 and 32 to be received in opening 70. Once the crossbar is within opening 70, fastener 40 attaches distal portion 22 to distal portion 32. Fastener 40 may then be tightened to cause pads 50 of clamp members 20 and 30 to tighten around a crossbar.

As shown in FIG. 2, clamp member 20 and clamp member 30 may include pads 50. Pads 50 are adapted to conform to, and tightly grip, a crossbar. Pads 50 may be made of a flexible or resilient material, such as rubber or any other suitable material. Pads 50 may allow a securing arrangement to conform to dimensionally different crossbars, keep the securing arrangement from scratching the crossbars, and provide extra grip to prevent the securing arrangement from sliding out of place.

Clamp members 20 and 30 may be inseparably attached at coupling regions 24 and 34. If distal portions 22 and 32 are also inseparably attached, securing arrangement 10 may be installed on a crossbar by sliding opening 70 of securing arrangement 10 over one end of the crossbar. Alternatively, clamp members 20 and 30 may be integrally formed from a single material, with regions 24 and 34 made of a material that is sufficiently flexible to allow distal portions 22 and 32 to separate enough to allow a crossbar to pass between them.

In some embodiments, coupling regions 24 and 34 are detachably coupled, which allows clamp member 30 to be completely separated from clamp member 20. Clamp member 30 may be detached from clamp member 20, placed under a crossbar, and reattached to clamp member 20. This provides additional flexibility in clamping securing arrangement 10 to a crossbar.

Clamp members 20 and 30 may be made of a substantially rigid material, such as a hard plastic or metal. Alternatively, clamp members 20 and 30 may be composed of a resilient or flexible material. When clamp members 20 and 30 are made of a flexible material, they are able to flex to conform to crossbars of different sizes and shapes.

As shown in FIG. 2, distal ends 22 and 32 are attached with fastener 40, which is a threaded fastener that tightens to decrease the size of opening 70 and loosens to increase the size of opening 70. Fastener 40 may also be a latch, a strap, a wire bail, or any other suitable fastening device. Examples of various clamp fastening devices are described in U.S. Pat. No. 6,681,971, the disclosure of which is herein incorporated by reference. Multiple fasteners of different lengths (e.g. a long fastener and a short fastener) may be provided for use with securing arrangement 10. A user might select the long fastener for use with a relatively large crossbar. While a long fastener might work with relatively small crossbars, the long fastener could extend beyond clamp member 20 or clamp member 30 in a way that would cause damage to a load or a vehicle. Thus, a user may choose to use the short fastener with a relatively small crossbar.

Distal portions 22 and 32 may be configured to fasten directly to one another, thus eliminating the need for a fastener. For example, distal portions 22 and 32 may snap together. Distal portions 22 and 32 may also be slidably engaged, hingedly engaged, or may hook together in some other manner.

Figure 3:
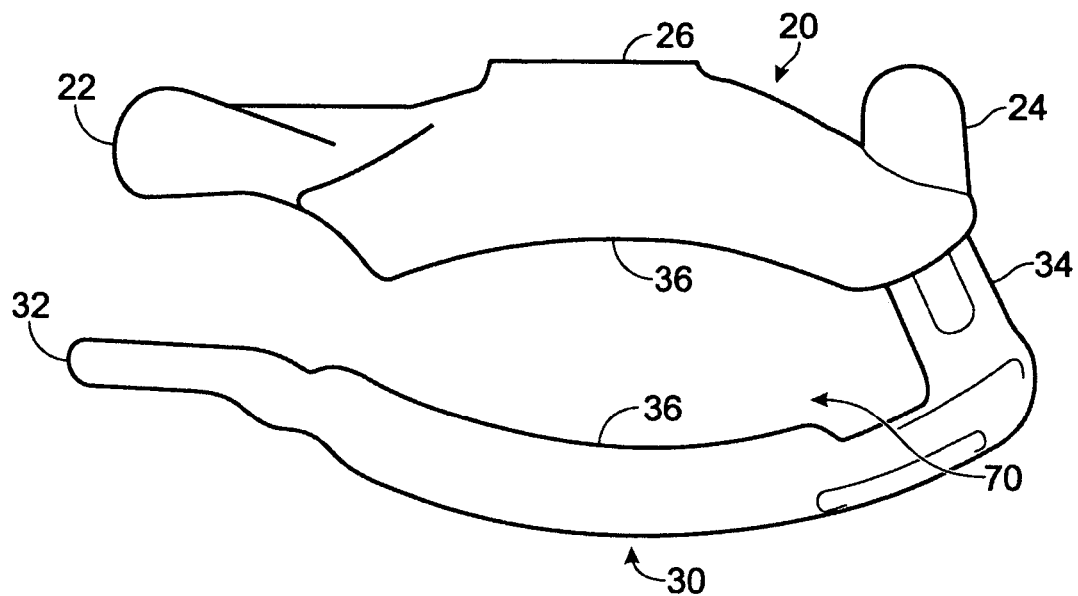
FIG. 3 is a side view of an opposing clamp member and an opposable clamp member in a securing arrangement.

FIG. 3 is a side view of clamp members 20 and 30. It is noted that clamp member 20 does not include a removable pad. Either of clamp members 20 and 30 may be used with or without a pad. Pads may also be included as removable inserts 50, as shown in FIG. 2. A pad may be included as an integral part of a clamp member, as shown by pads 36 in FIG. 3. Pads 36 cannot be removed from clamp member 20 or 30, and therefore are referred to as integral pads. Either or both clamp members 20 and 30 may include an integral pad.

It is also noted that clamp member 20 does not include mounting adjustment mechanism 60. According to some embodiments of the present disclosure, clamp member 20 attaches directly to a load-carrying member at mounting surface 26 instead of using a mounting adjustment mechanism. A mounting surface may be included on clamp member 30 instead of clamp member 20, or may be included on both clamp members 20 and 30 to provide additional clamp configurability.

FIGS. 2 and 3 show opening 70, which is configured to grip a rack bar in order to secure a load to a vehicle rack. While clamp members 20 and 30 form an elliptical opening, clamp members may be configured to form an opening of any shape or size. For example, opening 70 may be square, triangular or circular in shape.

Figure 4:
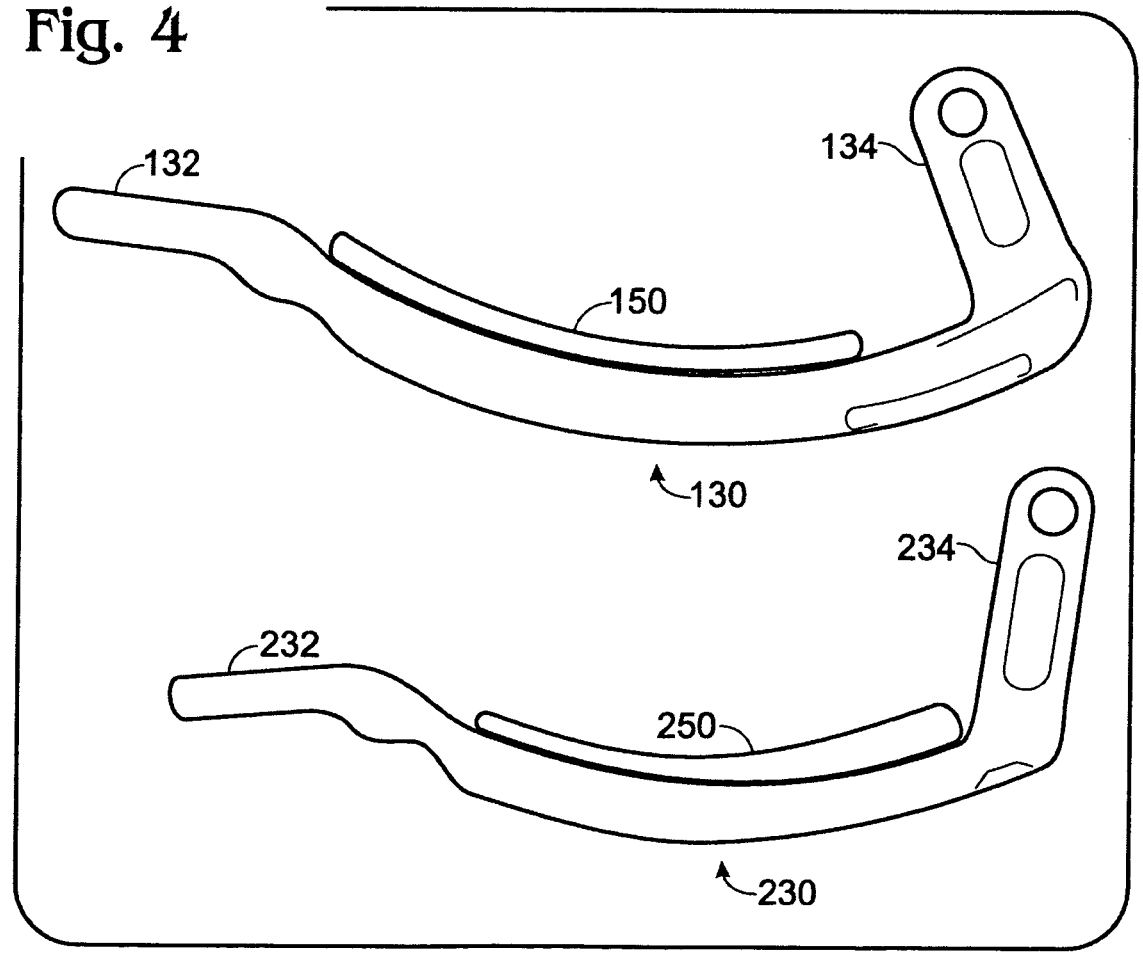
FIG. 4 is a side view of a plurality of opposing clamp members.

FIG. 4 is a side view of a plurality of opposing clamping members. Clamp member 130 is a different shape than clamp member 230. An opposing clamp member having a different shape and/or size than another opposing clamp member is referred to herein as being dimensionally different than the other opposing clamp member. Thus, FIG. 4 shows dimensionally different opposing clamp members. Clamp member 230 will create a dimensionally different opening when attached to clamp member 20 than opposing clamp member 130 will create when attached to clamp member 20, which serves to accommodate dimensionally different rack bars. While two opposing clamp members are shown, any number of dimensionally different opposing clamp members may be provided.

A user may select an opposing clamp member from a plurality of opposing clamp members based on the shape and/or size of a corresponding crossbar. Finding the appropriately shaped clamp member for a crossbar may be an iterative process in which a user first selects a first opposing clamp member. The first opposing clamp member is attached to an opposable clamp member and the user attempts to secure the opposing and opposable clamp members around a crossbar. If the crossbar does not fit in the opening between the first opposing clamp member and the opposable clamp member, a user may try a larger opposing clamp member. If the first opposing clamp member and the opposable clamp member are not capable of tightly gripping the crossbar, a user may try a smaller opposing clamp member. A user may also select an opposing clamp member by looking up a vehicle make or model, or a rack make or model, in a clamp fitting guide.

Clamp member 130 is fitted with a pad 150, and clamp member 230 is fitted with a pad 250. According to some embodiments, pads 150 and 250 are removable and interchangeable inserts. Pads 150 may be removed from clamp members and attached to clamp member 230, and pad 250 may be removed from clamp member 230 and attached to clamp member 130. As previously mentioned, pads 150 and 250 are optional. Furthermore, a plurality of interchangeable dimensionally different inserts may be provided for use with opposing or opposable clamp members, thus providing another degree of clamp configurability.

Inserts and pads may have any shape and/or size, and may be provided to accommodate round crossbars, square crossbars, or crossbars of any other shape. According to some embodiments, changing an orientation of an insert changes the shape of a clamp member. For example, insert 250 is thicker on the end closer to coupling portion 234 than on the end closer to distal portion 232. Insert 250 may be rotated so that the thicker end is closer to distal portion 232.

FIG. 4 shows hinge arms that include coupling regions 134 and 234. In clamp member 130, the angle of the hinge arm allows clamp member 130 to create a larger opening than clamp member 230 is capable of creating. The angle of the hinge arm of clamp member 230 allows clamp member 230 to create a smaller opening than clamp member 130 is capable of creating. An opposing clamp member may be formed with a hinge arm at any angle relative to the opposing clamp member.

FIGS. 5 and 6 are side views and partially cross-sectional views of a portion of an exemplary securing arrangement with an opposable clamp member having a plurality of receiving sections. As shown in FIG. 5, coupling portion 24 of clamp member 20 includes alternative receiving sections 24a and 24b. Coupling portion 34 of clamp member 30 includes an extension 38 that may be inserted into one of receiving sections 24a and 24b. Alternatively, coupling portion 24 may include a plurality of extensions and coupling portion 34 may include a receiving section.

As shown in FIG. 5, extension 38 may be inserted into receiving section 24b. FIG. 6 shows extension 38 inserted into receiving section 24a. When extension 38 is attached to receiving section 24b, securing arrangement 10 is capable of accommodating larger crossbars than when extension 38 is attached to receiving section 24a. Extension 38 and receiving sections 24a and 24b may be configured to provide a hinged connection of clamp members 20 and 30, allowing clamp member 30 to pivot at extension 38 to change a size of opening 70.

FIG. 7 is a side view of an opposable clamp member 20, a mounting adjustment mechanism 62, and a pad 50. A top surface of mounting adjustment mechanism 62 is configured to support a load-carrying member. A load-carrying member may be attached to clamp member 20 by passing a threaded fastener 68 up through clamp member 20, mounting adjustment mechanism 62, and a mounting region of the load-carrying member. Alternatively, threaded fastener 68 may be passed down through the mounting region of the load-carrying member, mounting adjustment mechanism 62, and clamp member 20. A nut may be fastened to threaded fastener 68 to secure the load-carrying member to clamp member 20. Instead of using a nut, the mounting region of the load-carrying member may be configured with a threaded receiving portion for receiving an end of threaded fastener 68. It will be appreciated that any other suitable fastener may be used in the place of threaded fastener 68.

Mounting adjustment mechanism 62 is a different shape than mounting adjustment mechanism 60, and the two mounting adjustment mechanisms 60 and 62 may be interchangeably used with securing arrangement 10. Mounting adjustment mechanisms of other shapes and sizes may also be provided, allowing a user to select an appropriate mounting adjustment mechanism for use with a particular load-carrying member. When multiple mounting adjustment mechanisms are provided, two or more mounting adjustment mechanisms may be used together. For example, mounting adjustment mechanism 60 could be stacked on top of mounting adjustment mechanism 62, thus providing additional spacing between clamping member 20 and a load-carrying member.

As previously mentioned, threaded fastener 68 secures mounting mechanisms 60 and 62 to clamp member 20. When threaded fastener 68 is loosened, mounting adjustment mechanisms 60 and 62 may be pivoted to the orientations shown in FIGS. 8 and 9. Mounting adjustment mechanisms 60 and 62 can thus be positioned at a desired angle relative to the upper clamp member, which may be useful for carrying certain types of loads, compensating for angled crossbars, or attaching to some types of load-carrying members. For example, if crossbar 4 were angled downward toward the front of vehicle roof 2 (right-hand side of FIG. 1), then the mounting adjustment mechanism could be angled to compensate for the orientation of crossbar 4.

Mounting adjustment mechanisms 60 and 62 include a plurality of detents 64 for maintaining mounting adjustment mechanisms 60 and 62 at a desired angle. When the threaded fastener is tightened, one of detents 64a, 64b, and 64c is brought into mating contact with a rib 18 such that mounting adjustment mechanism 60 or 62 is maintained at the desired angle while supporting a load-carrying member. Mounting adjustment mechanism 60 may be rotated as show in FIG. 8, such that detent 64c is brought into mating contact with rib 18. Alternatively, FIG. 9 shows that detent 64a is brought into mating contact with rib 18.

Although FIGS. 7-9 show a mounting adjustment mechanism with three detents, mounting adjustment mechanisms may be provided with any number of detents or without any detents. In some embodiments, the detents may be provided on clamp member 20 and the rib may be provided on the mounting adjustment mechanisms. Furthermore, any suitable retaining device may be used to secure mounting adjustment mechanisms 60 and 62 at an angle.

As shown in FIG. 8, mounting adjustment mechanism 60 includes an opening 66. Opening 66 is configured to receive a bolt or other suitable fastener to secure a load-carrying member to mounting adjustment mechanism 60. Mounting adjustment mechanism 60 may also be secured to a load carrying member by passing threaded fastener 68 through mounting adjustment mechanism 60 and into a load-carrying member, as described in the foregoing discussion of mounting adjustment mechanism 62.

The components of securing arrangement 10 may be provided as part of a mounting system kit. The mounting system kit may include one or more of any of the components shown in FIGS. 2-9, and may include components that are not shown in any of the figures. For example, the kit may include multiple opposing clamp members, multiple mounting adjustment mechanisms, multiple threaded fasteners, multiple fasteners, and multiple inserts.

Some of the components may be used interchangeably to maximize securing arrangement configurability and minimize the number of parts included in the kit. For example, if one opposable clamp member and three opposing clamp members are included in the kit, then two inserts (instead of four inserts) may be provided. One insert could be attached to the opposable clamp member and the other insert could be attached to the opposing clamp member in use at the time.

The kit may also include one opposable clamp member and a plurality of alternative opposing clamp members, as noted in the discussion of FIG. 4. Alternatively, the kit may include a plurality of dimensionally different opposable clamp members and only one opposing clamp member. A wrench or other tools may be included in the kit so that the user does not need to purchase any tools to configure the securing arrangement.

Including multiple interchangeable parts allows a single kit to be compatible with various vehicles and racks. Thus, a manufacturer may produce a single kit compatible with most rack models. This means that retailers would only need to stock a single kit for their customers, and customers would not have to buy new connecters each time they want to mount a load-carrying member on a different rack or vehicle.

The present disclosure sets forth numerous features for increasing the configurability of a securing arrangement. A securing arrangement may be configured by implementing one or more of the features set forth herein. For example, a user may select, based on the size of a crossbar, an opposing clamp member from a plurality of dimensionally different opposing clamp members. The user then attaches the opposing clamp member to an opposable clamp member, places inserts into the clamp members, and places the clamp members around the crossbar. The user attaches distal ends of the opposing and opposable clamp members using a fastener, and tightens the fastener. If the clamp member is not securely attached to the crossbar, the user may select a clamp member with a different size or shape, a different size fastener, or an insert with a different size or shape. The user may also attach the opposing clamp member to different receiving portions in the opposable clamp member. The user may continue to test different configurations of components until the securing arrangement firmly attaches to the crossbar.

It will be appreciated from the foregoing disclosure that the present description provides many different possibilities for adapting a securing arrangement to different sizes of crossbars while minimizing the need to manufacture and stock various clamps for various shapes and sizes of crossbars.

While the present disclosure focuses on securing arrangements for securing load-carrying members to vehicle rack crossbars, it is noted that the securing arrangements described herein may be used on any type of bar, including rails or other structural members of a vehicle rack.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein.

No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements. Where the claims recite first and second elements, or first and second alternative elements, such claims should be understood to include incorporation of two or more such elements, neither requiring nor excluding three or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A mounting system for securing a load to a vehicle-mounted rack, comprising:
   first and second opposing clamp members, wherein the first and second opposing clamp members are dimensionally different; and
   an opposable clamp member configured to alternatively attach to the first and second opposing clamp members, wherein
      the opposable clamp member and the first opposing clamp member define a first opening configured to receive and grip a first bar, and
      the opposable clamp member and the second opposing clamp member define a second opening configured to receive and grip a second bar
   a load-carrying member configured to attach to the vehicle-mounted rack to support the load; and
   a mounting adjustment mechanism pivotally mounted to the opposable clamp member and configured to secure the load carrying member to the opposable clamp member, the mounting adjustment mechanism being further configured to adjust the orientation of the load-carrying member relative to the opposable clamp member.

2. The mounting system of claim 1, further comprising:
   a first insert configured to attach to at least one of the first opposing clamp member, the second opposing clamp member, and the opposable clamp member; and
   a second insert configured to be interchangeable with the first insert, wherein the second insert is dimensionally different than the first insert.

3. The mounting system of claim 1, wherein
   the opposable clamp member includes a plurality of alternative coupling sections,
   the first opposing clamp member is configured to alternatively attach to each coupling section in the plurality of alternative coupling sections, and
   the second opposing clamp member is configured to alternatively attach to each coupling section in the plurality of alternative coupling sections.

4. The mounting system of claim 3, further comprising a fastener configured to adjustably connect a distal portion of the opposable clamp member to a distal portion of one of the first and second opposing clamp members.

5. A mounting system for securing a load to a vehicle-mounted rack, the system comprising:
   a load-carrying member adapted to at least partially secure the load to the vehicle-mounted rack;
   a first clamp member;

a second clamp member configured to attach to the first clamp member to create an opening, wherein the opening is configured to receive and grip a crossbar of the vehicle-mounted rack; and a mounting adjustment mechanism pivotally attached to the first clamp member for securing the load-carrying member to the first clamp member, wherein the mounting adjustment mechanism is configured to adjust the orientation of the load-carrying member relative to the first clamp member.

6. The mounting system of claim 5, wherein the first clamp member includes a detent configured to secure the mounting adjustment mechanism to the first clamp member at a desired angle.

7. The mounting system of claim 5, wherein
the first clamp member includes a plurality of alternative coupling sections, and
the second clamp member is configured to alternatively attach to each coupling section in the plurality of alternative coupling sections.

8. The mounting system of claim 5, further comprising a plurality of alternative clamp members, wherein
the plurality of alternative clamp members includes the second clamp member,
each alternative clamp member in the plurality of alternative clamp members is dimensionally different, and
the first clamp member is configured to alternatively attach to each clamp member in the plurality of alternative clamp members.

9. The mounting system of claim 5, further comprising:
an additional mounting adjustment mechanism configured to attach to the first clamp member and the load-carrying member, wherein
the additional mounting adjustment mechanism is configured to adjust an angle of the load-carrying member relative to the first clamp member, and
the additional mounting adjustment mechanism is dimensionally different than the mounting adjustment mechanism.

10. The mounting system of claim 9, wherein the mounting adjustment mechanism and the additional mounting adjustment mechanism are configured to be alternatively selected for use with different types of load-carrying members.

11. The mounting system of claim 9, wherein the mounting adjustment mechanism and the additional mounting adjustment mechanism are configured to be used together to provide additional spacing between the first clamp member and the load-carrying member.

12. A mounting system for securing a load to a vehicle-mounted rack, the system comprising:
a load-carrying member adapted to at least partially secure the load to the vehicle-mounted rack;
a first clamp member including a first coupling section and a second coupling section formed in the same piece, wherein the first clamp member is configured to attach to attach to the load-carrying member; and
a second clamp member configured to alternatively attach to the first and second coupling sections without any intervening auxiliary linkage, wherein
the second clamp member is configured to attach to the first coupling section to define a first opening configured to receive and grip a first crossbar,
the second clamp member is configured to attach to the second coupling section to define a second opening configured to receive and grip a second crossbar, and
the first opening is dimensionally different than the second opening.

13. The mounting system of claim 12, wherein
the second clamp member includes a coupling extension,
the first and second coupling sections are receiving sections, and
the second clamp member is configured to change a shape of the first and second openings by pivoting at the coupling extension.

14. The mounting system of claim 12, further comprising a plurality of alternative clamp members, wherein
the plurality of alternative clamp members includes the second clamp member,
each alternative clamp member in the plurality of alternative clamp members is dimensionally different, and
the first clamp member is configured to alternatively attach to each clamp member in the plurality of alternative clamp members.

15. The mounting system of claim 12, further comprising a mounting adjustment mechanism configured to secure the load carrying member to the first clamp member and configured to secure the load carrying member to the first clamp member, the mounting adjustment mechanism being further configured to adjust the orientation of the load-carrying member relative to the first clamp member.

16. A mounting system kit having component parts capable of being assembled for securing a load to a crossbar of a vehicle-mounted rack, the kit comprising:
a first opposing clamp member;
a second opposing clamp member, wherein the second opposing clamp member is dimensionally different than the first opposing clamp member;
an opposable clamp member configured to alternatively attach to the first and second opposing clamp members to secure to a load-carrying member to the crossbar of the vehicle-mounted rack; and
a plurality of mounting adjustment mechanisms, wherein each mounting adjustment mechanism in the plurality is configured to be inserted between a load-carrying member and the opposable clamp member, each mounting adjustment mechanism being further configured to pivot relative to the opposable clamp member to adjust the orientation of the load-carrying member relative to the opposable clamp member.

17. The mounting system kit of claim 16, further comprising:
a first insert configured to attach to at least one of the first opposing clamp member, the second opposing clamp member, and the opposable clamp member; and
a second insert configured to be interchangeable with the first insert, wherein the second insert is dimensionally different than the first insert.

* * * * *